UNITED STATES PATENT OFFICE.

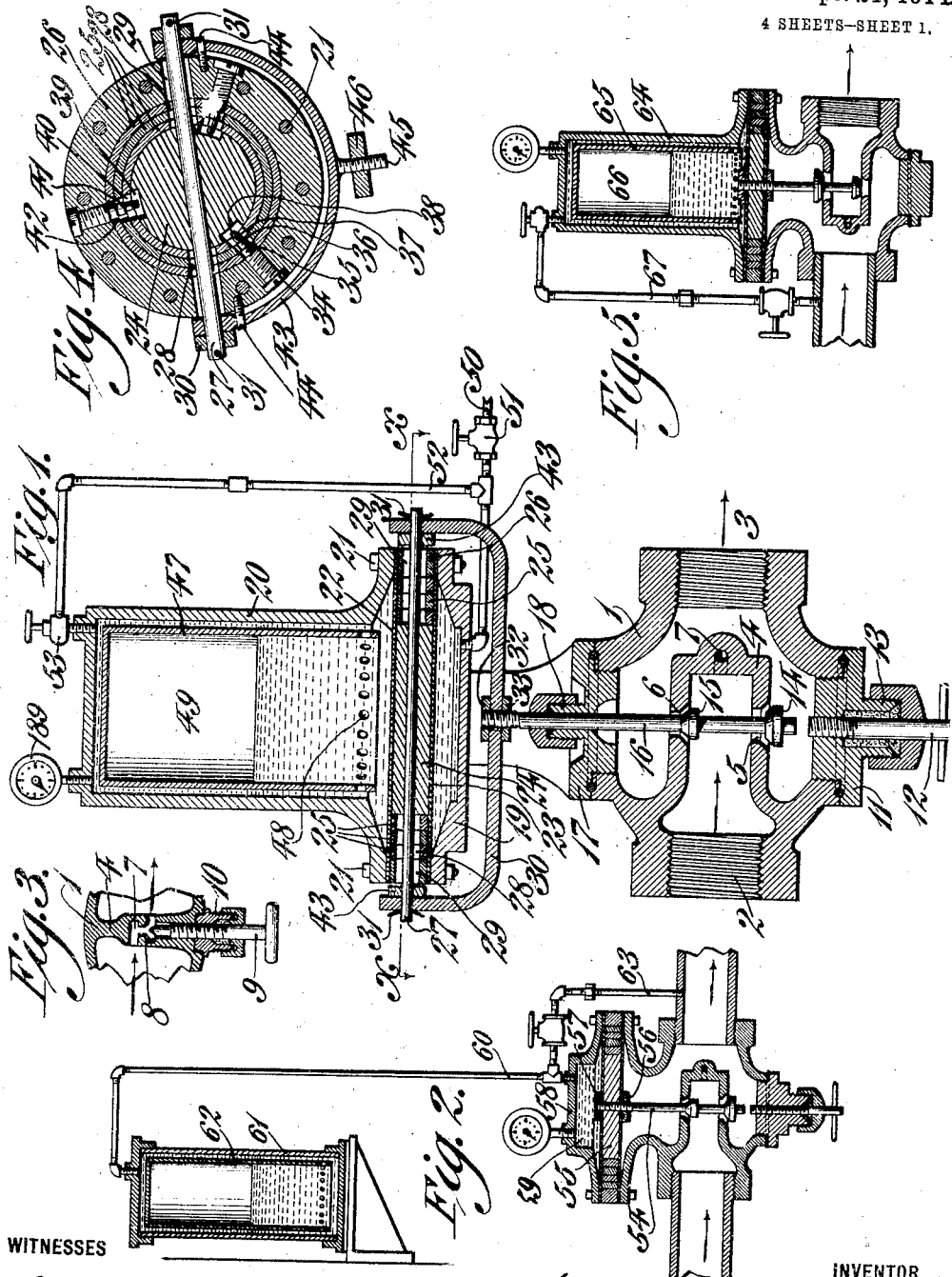

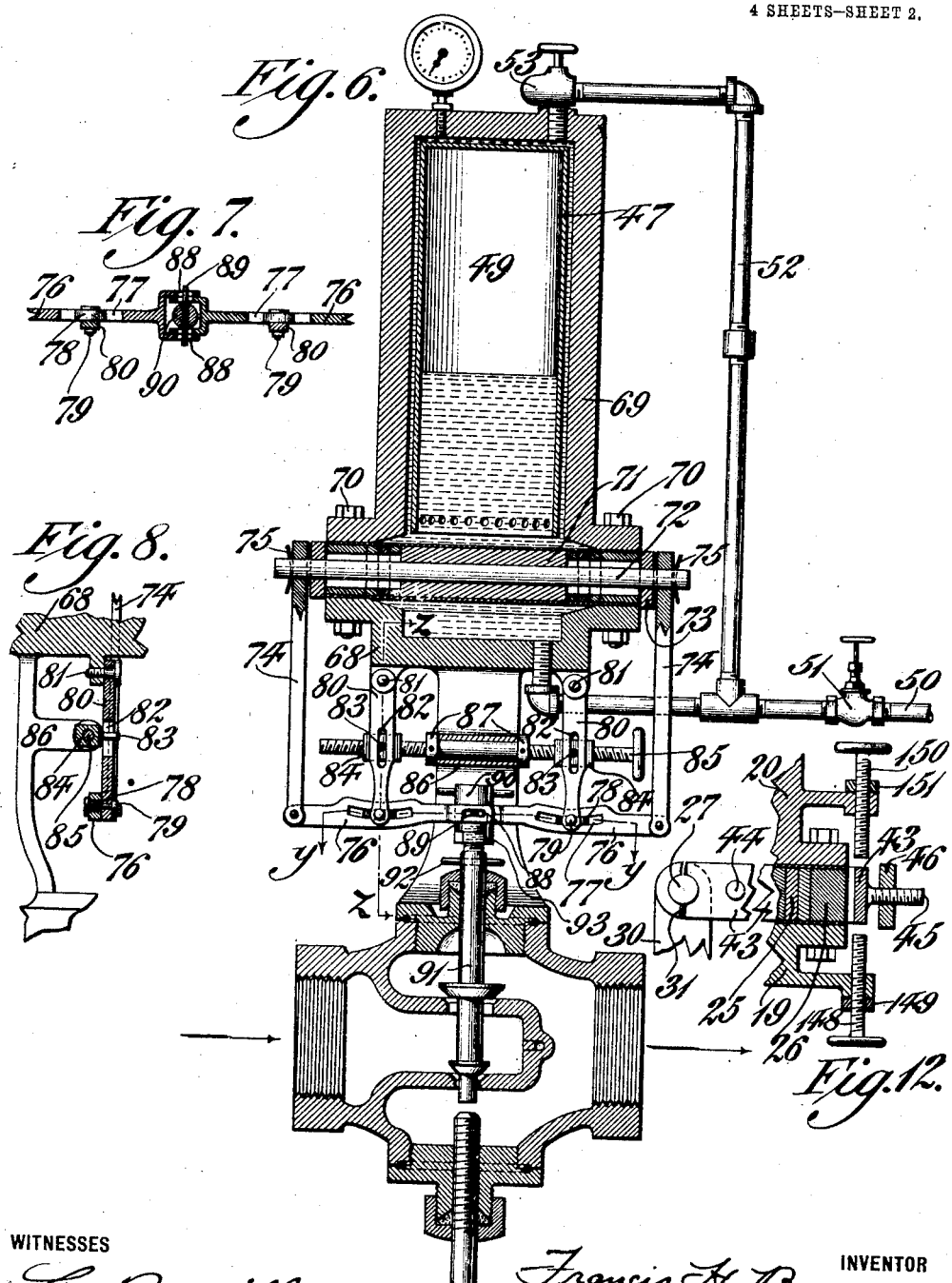

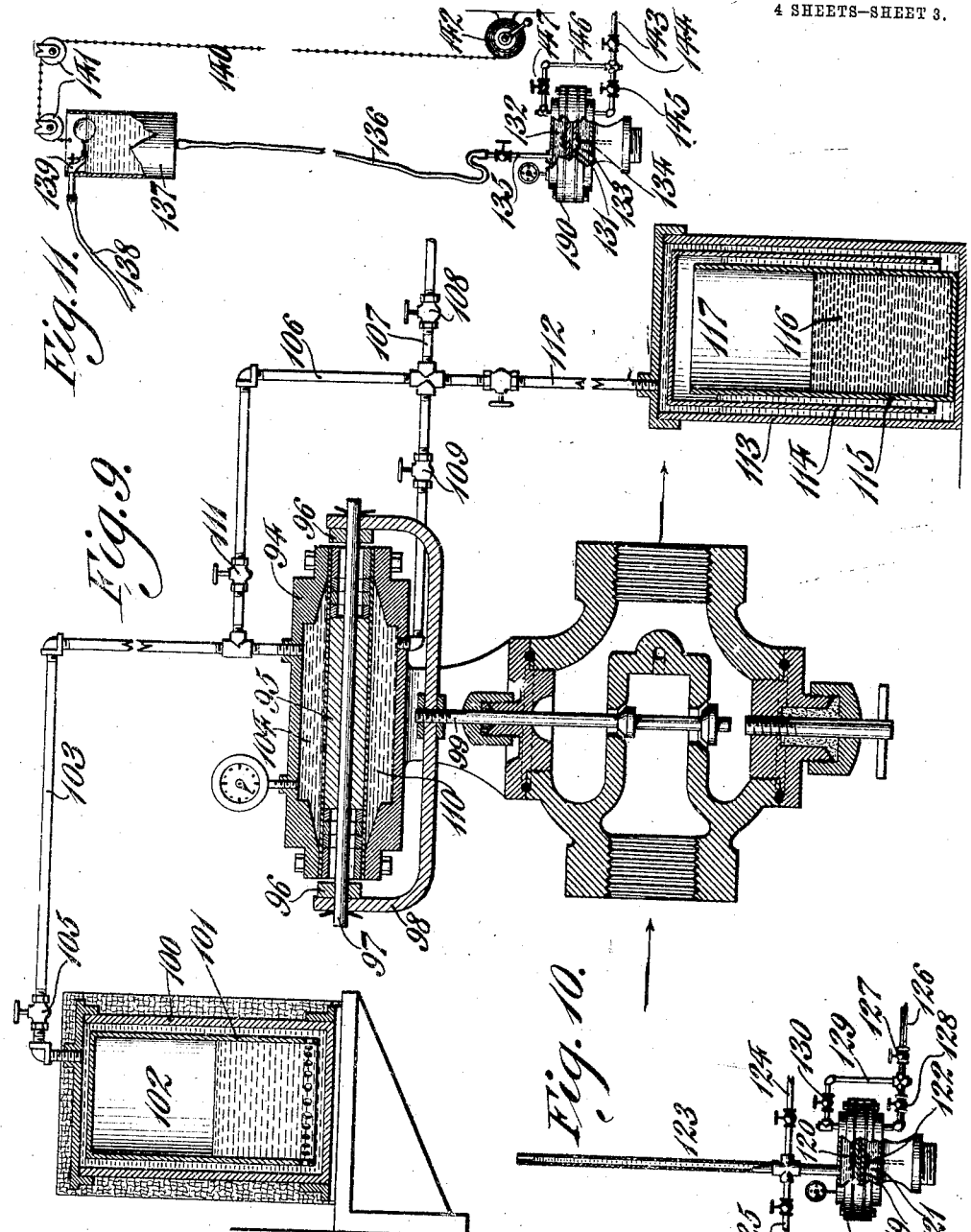

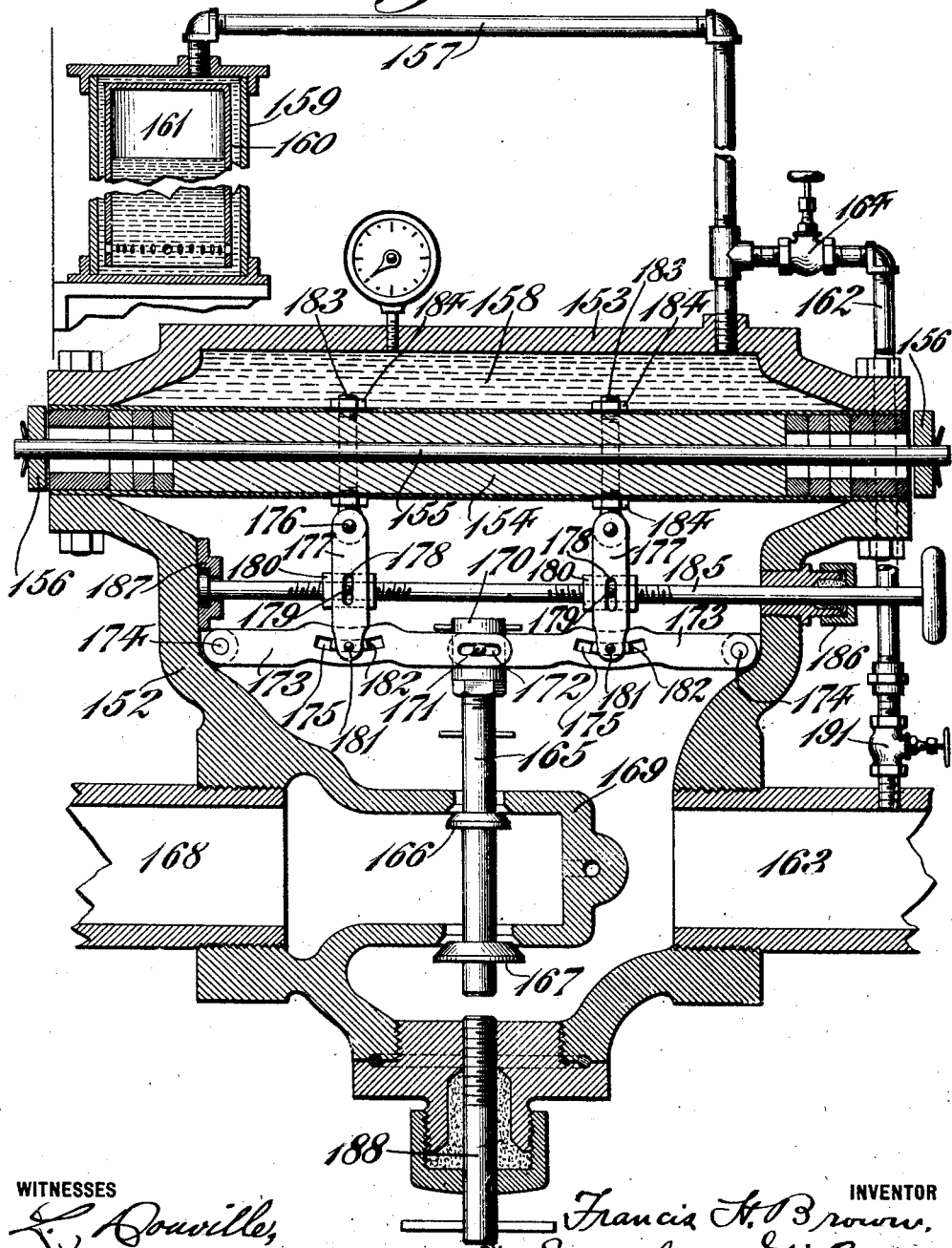

FRANCIS H. BROWN, OF RIDLEY PARK, PENNSYLVANIA.

FLUID-CUSHION VALVE OR OTHER REGULATING MECHANISM.

1,094,116.

Specification of Letters Patent. Patented Apr. 21, 1914.

Application filed February 18, 1913. Serial No. 749,067.

*To all whom it may concern:*

Be it known that I, FRANCIS H. BROWN, a citizen of the United States, residing at Ridley Park, county of Delaware, State of Pennsylvania, have invented a new and useful Fluid-Cushion Valve or other Regulating Mechanism, of which the following is a specification.

My invention in its broad and generic scope consists of a novel construction of a valve or other regulating mechanism wherein the element to be controlled is opposed by a pressure of any predetermined or desired standard which has a universal range of adjustment and which includes a fluid cushion and novel means of forming this cushion, means for varying the volume of such cushion whereby the movement of the diaphragm or its equivalent in one direction is opposed by a pressure of any desired standard, and means for varying the throw of the valve with respect to the movement of the diaphragm.

My invention further consists of a novel valve or other regulating mechanism for controlling and regulating motion of mechanism, pressures, flow of fluids and similar purposes, and which is automatic in its operation and wherein the friction of the moving parts is practically eliminated and which has a universal range of adjustment of working pressure without affecting the sensitiveness of operation.

It further consists of a novel construction of a valve mechanism in conjunction with which an air cushion is employed which is subjected to the pressure exerted against one side of the diaphragm or its equivalent whereby any desired range of working pressure may be provided without affecting the uniformity of the action or the sensitiveness of operation of the diaphragm.

It further consists of novel means for forming the air cushion, which is formed by an arrangement and combination of non-mixing fluids such as air or gas, and water, oil or similar fluid, the former being trapped in an inverted container which is surrounded by water or a similar fluid and this cushion is attached to or communicates with one side of the diaphragm or its equivalent forming the opposing pressure to the pressure to be controlled thus providing the positive unfailing action required, combined with the extreme sensitiveness and resiliency characteristic of the pneumatic cushion, and which is equally reliable and sensitive at whatever pressure used.

It further consists of novel means for changing the stroke of the valve whereby the throw of the valve may have any desired ratio with respect to the movement of the diaphragm.

It further consists of a novel cushion valve mechanism which is especially adapted to be employed for a large variety of purposes such as pressure reducing, relief, or excess valves, boiler feed pump governors, pumps of all kinds such as for example, elevator, fire, or tank pumps, water works, air brakes and similar service, heating systems, engine governors and other purposes too numerous to mention.

It further consists of a novel construction of a diaphragm and novel means for connecting the same with the valve.

It further consists of a novel construction and arrangement of air cushion and novel means for adjusting the pressure thereon or thereagainst in accordance with the standard of working pressure desired.

It further consists of a novel construction of a valve regulating mechanism which is adapted to operate and automatically control any desired type of valve.

It further consists of other novel features of construction, all as will be hereinafter fully set forth.

For the purpose of illustrating my invention I have shown herein certain embodiments thereof which will give in practice advantageous and reliable results although it is of course to be understood that the various instrumentalities of which my invention consists can be variously arranged and organized and that my invention is not limited to the exact arrangement and organization of these instrumentalities as herein set forth.

Figure 1 represents a sectional elevation of a valve regulating mechanism embodying my invention. Fig. 2 represents a sectional elevation of another embodiment of my invention. Fig. 3 represents a sectional plan view of a portion of the valve body seen in Figs. 1 and 2. Fig. 4 represents a sectional plan view on line $x$—$x$ Fig. 1. Fig 5 represents a sectional elevation of another embodiment of my invention. Fig. 6 represents a sectional elevation of another embodiment of my invention. Fig. 7 represents a section on line y—y Fig. 6. Fig. 8 represents a section on line z—z Fig. 6. Fig. 9 represents a sectional elevation of another embodiment of my invention which provides for the thermostatic control of the valve. Figs. 10 and 11 represent side elevations of other embodiments of my invention. Fig. 12 represents a sectional view of a portion of Fig. 1. Fig. 13 represents a sectional elevation of another embodiment of my invention.

Similar numerals of reference indicate corresponding parts in the figures.

Referring to the drawings, the construction of the diaphragm, the air cushion and the manner of forming it and regulating the standard of working pressure employed is substantially the same in all the embodiments of my invention herein shown but I have shown different types of valves and different manners of connecting the valve with respect to the diaphragm to cover different working conditions.

Referring first to the embodiment seen in Fig. 1, 1 designates a valve casing provided with an inlet 2 and an outlet 3 in the usual manner and between which is located a diaphragm or baffle 4 having ports 5 and 6 therethrough and also a port 7 therethrough, as will be best understood by reference to Fig. 3. The inlet and outlet of the port 7 are out of alinement in order to form a valve seat 8 with which coöperates a valve 9 provided with a stuffing box 10. 11 designates a removable closure provided with a stop member 12 in threaded engagement therewith and which also passes through a stuffing box 13. 14 and 15 designate valve heads adapted to coöperate with the valve seats formed by the valve ports 5 and 6 respectively said valve heads being carried by a valve stem 16 the lower end of which coöperates with the adjustable stop 12 to limit the opening of the valves 14 and 15. The valve stem 16 passes through a removable closure 17 and through a stuffing box 18 said closure 17 having connected therewith a casing member 19 to which is connected a bonnet 20 by means of fastening devices 21 which also pass through a diaphragm of novel construction. The diaphragm consists of upper and lower flexible members 22 and 23 respectively between which is located a central spacing block 24, a plurality of annular rings 25 and an outer spacing annulus 26 it being understood that the fastening devices 21 preferably pass through casing members 19 and 20, the diaphragm members 22 and 23 and the spacing annulus 26. The construction and arrangement of the spacing rings will be more clearly understood by reference to Fig. 4, it being seen that by such construction an extended flexible joint is provided near the outer periphery of the diaphragm. 27 designates a bar or rod which is fixed in the central spacing block 24 but has a free play in the aperture 28 of the spacing rings 25 and the apertures 29 of the spacing annulus 26. 30 designates a yoke the ends of which are mounted on the rod or bar 27 the latter being provided with pins 31 to maintain the parts in assembled position. The yoke 30 is apertured to receive the valve stem 16 which latter is secured in adjusted position with respect thereto by means of the nuts 32 and 33. In order to limit the range of movement of the diaphragm members I provide limiting plugs 34 having bearings 35, 36 and 37 corresponding in number to the number of rings and a bearing 38 in the central spacing block 24, it being noted that these bearings decrease in diameter progressively toward the central block 24. 39, 40, 41 and 42 designate openings in the central spacing block 24 and the rings 25 it being noted that the aperture 39 is of largest diameter while the apertures 40, 41 and 42 respectively decrease in diameter toward the outer periphery of the diaphragm, since as will be apparent the central portion of the diaphragm has the largest range of movement. 43 designates a counterbalance which in the present instance is shown as consisting of a yoke the ends of which are loosely mounted on the rod or bar 27 said yoke being pivotally carried by the spacing annulus 26 by means of the pins 44 and said yoke is provided with a threaded extension 45 having a weight 46 in adjustable engagement therewith, whereby the diaphragm may be accurately balanced irrespective of the opposing pressure on one side thereof. 47 designates an inverted container provided in the present instance with ports 48 through its side wall at its lower end, and such inverted container is adapted to be partially filled with liquid to form a fluid cushion 49. 189 designates a pressure indicator. 50 designates a conduit communicating with a source of fluid supply and with the chamber formed in the casing member 19, said conduit 50 being provided with a controlling valve 51. 52 designates a conduit communicating with the conduit 50 and with the chamber formed by the bonnet 20 said conduit 52 being provided with a controlling valve 53.

In the embodiment seen in Fig. 2, I have shown a construction which is within the broad and generic scope of my invention as disclosed in Fig. 1, and in this embodiment instead of connecting the valve with the diaphragm by means of the yoke and its adjuncts as seen in Fig. 1, the valve stem 54 is connected with a diaphragm 55 the same corresponding in construction to that seen in Figs. 1 to 4 except that no counterbalancing member is provided. The valve stem 54 in this embodiment passes through the diaphragm 55 and is adjusted with respect thereto by means of clamping or packing nuts 56 and 57 in threaded engagement therewith. The bonnet 58 in this embodiment does not form a container for the fluid cushion arrangement but forms a chamber 59 which communicates by means of a conduit 60 with a tank 61 having therein an inverted container 62 which provides for an air cushion as described in Fig. 1. 63 designates a valve controlled conduit communicating with the conduit 60 and the valve outlet.

In the embodiment seen in Fig. 5, the air cushion is formed in the bonnet 64 in a similar manner to that seen in Fig. 1, an inverted container 65 being provided which forms an air cushion 66 which may be adjusted by means of a valve controlled conduit 67 which communicates with the inlet to the valve. The diaphragm and the valve correspond in construction to that seen in Fig. 2 except that the valve heads seat on top.

Referring now to the embodiment seen in Figs. 6 to 8 inclusive, I have shown another embodiment of my invention wherein the construction is similar to that seen in Fig. 1 except that the valve seats on top of the baffle and in addition I have shown therein novel means for varying the throw of the valve so that the latter will have any desired travel relative to the movement of the diaphragm.

In the embodiment seen in Fig. 6, 68 and 69 designate the casing members which are secured together by means of any desired type of fastening devices 70 which latter also pass through a flexible diaphragm 71 illustrated herein as of the same type as that seen in Fig. 1. 72 designates a cross bar carried by the diaphragm 71 and having a predetermined range of movement. 73 designates a counterbalance which preferably corresponds in construction to the counterbalance 44 seen in Fig. 4. 74 designates arms mounted on the cross bar 72 and prevented from lateral movement thereon by means of the pin 75. 76 designates levers one end of each of which is pivoted to an arm 74. Each lever 76 is provided with a cam groove 77 therein in which is adapted to travel a shoe 78 provided with a pin 79 journaled in an arm 80 which latter is pivoted at 81 to the casing member 68. This arm 80 is provided with a longitudinally extending slot 82 in which is adapted to travel a pin 83 mounted on a swivel 84 with which latter has threaded connection a screw 85 adapted to be manually actuated and provided in the present instance with a right and a left-hand thread thereon in order that both arms 80 will be simultaneously adjusted. This screw 85 is mounted in a journal 86 and the longitudinal movement of said screw 85 is prevented by means of the set collars 87. The inner end of each lever 76 is preferably forked, as will be best understood by reference to Fig. 7, it being seen that each arm of the fork is apertured as at 88 in order that a pin 89 may pass therethrough said pin being carried by a cap 90 which is longitudinally adjustable with respect to the valve stem 91 and in order to illustrate one manner of accomplishing this result I have shown the valve stem 91 as being in threaded engagement with the cap 90. In order that the valve stem 91 may be properly adjusted in order to accurately set the valve heads with respect to their seats, I provide a pin 92 which passes through the valve stem 91 and I also preferably provide a lock nut 93 whereby the valve stem may be locked in its adjusted position, with respect to the cap 90. The valve body corresponds in construction to that seen in Fig. 1 and the only difference between the valve head is that in Fig. 6 the valve head seats above the ports instead of below the same as in Fig. 1, and since this construction will be clear to any one skilled in this art, it is deemed to be unnecessary to describe the detailed construction of the valve casing and the valve. It will be noted that the cam grooves 77 form the arc of a circle, the center of the radius being the pivotal point 81.

Referring now to the embodiment seen in Fig. 9, I have shown therein another form of my invention in which the variable or actuating means for the diaphragm comprises a temperature or thermostatic element. 94 designates a container having a diaphragm 95 therein which divides the container into two compartments. This diaphragm corresponds in construction to that seen in Fig. 1 and is provided with a counterbalance 96 corresponding to the counterbalance 43 in Fig. 4 and this counterbalance 96 is mounted on a bar 97 connected with the diaphragm 95 and having a predetermined range of movement therewith. 98 designates a yoke adjustably connected with a valve stem 99 and since the valve heads and valve casing and ports are similar in construction to that seen in Fig. 1 a detailed description thereof is believed to be unnecessary. 100 designates an insulated container within which is mounted an inverted tank 101 which is open at its lower end and which in practice forms an air or fluid cushion 102. 103 designates a conduit communicating with the insulated container 100 and with the chamber 104 on one side of the diaphragm 95 said conduit 103 being provided with a valve 105. 106 designates a conduit communicating with the conduit 103 and with a conduit 107 which latter is provided with valves 108 and 109 and which communicate with a chamber 110 of the casing 94. 111 designates a valve in the conduit 106. 112 designates a valve controlled conduit communicating with the conduit 107 and with a container 113 in which latter is mounted an inverted container 114 within which latter is located a container 115 which is open at its top. The innermost container 115 is adapted to contain a material which is sensitive to changes in temperature, such as for example mercury, as indicated at 116, and above the mercury is formed an air chamber 117 as will more clearly hereinafter appear in the detailed description of the operation of this embodiment of my invention.

In the embodiment seen in Fig. 10, 118 designates a container in which is located a diaphragm 119 preferably of the type already described in connection with the other figures of the drawings and forming an upper compartment 120 and a lower compartment 121, the diaphragm being connected with the valve stem 122. 123 designates a conduit extending to any desired height above the casing 118 and communicating with the compartment 120 said conduit 123 being adapted to be filled by means of fluid forced through the valve controlled conduit 124. 125 designates a valve controlled conduit communicating with the conduit 123 whereby the height of fluid in said latter conduit may be varied as desired in order to vary the pressure exerted against the diaphragm 119. 126 designates a conduit communicating with the compartment 121 and provided with valves 127 and 128. 129 designates a conduit communicating with the conduit 126 between the valves 127 and 128 and communicating also with the compartment 120 and provided with a valve 130.

In Fig. 11, I have shown another embodiment of my invention wherein I provide novel means for varying the standard of pressure exerted against the diaphragm. In this embodiment 190 designates a casing which is divided by means of a diaphragm 131 into two compartments 132 and 133 it being understood that the diaphragm 131 is connected with a valve stem 134 or other desired mechanism which is to be controlled. 135 designates a valve controlled conduit communicating with the compartment 132 and in communication with this conduit 135 is a flexible connection or conduit 136 whereby a container 137 is placed in communication with the compartment 132. 138 designates a filling conduit through which fluid passes to fill the container 137 and in order to maintain the fluid in said container 137 at a constant level I provide a float controlled valve 139. 140 designates a cable passing over pulleys 141 supported at a desired height in any desired manner, said cable being connected with the container 137 and with a manually actuated adjusting device 142 whereby the height of the container 137 with respect to the diaphragm casing 130 may be adjusted as desired in order to vary the pressure exerted against the diaphragm. 143 designates a conduit provided with valves 144 and 145. 146 designates a conduit communicating with the conduit 143 between the valves 144 and 145 and also with the compartment 132 said conduit 146 being provided with a valve 147. The conduit 143 communicates with the compartment 133.

It will be apparent that both the conduit 123 seen in Fig. 10 and the container 137 seen in Fig. 11 are open at their upper end so as to be exposed to atmospheric pressure.

In order to provide positive means for limiting the range of movement of the counterbalance and thereby of the diaphragm, the casing member 19, as shown in Fig. 12, is preferably provided with a set screw 148, the end of which is in the path of travel of the counterbalance 43, and this set screw is provided with a lock nut 149. The other casing member such as 20 is provided with a set screw 150, the end of which is in the path of the counterbalance 43, and the set screw 150 is provided with a lock nut 151. It will of course be understood that the means for limiting the movement of the diaphragm, and maintaining the same normally in balanced position, irrespective of the standard of pressure employed, is preferably employed in all cases but can be omitted in the embodiment shown in Figs. 2 and 5, if desired.

Referring now to Fig. 13, I have shown my invention as provided with novel means for varying the throw of the valve such means being located within the valve casing and adapted to be manually adjusted by devices exterior of the valve casing, whereby the throw of the valve relative to the movement of the diaphragm may be varied as desired, without cutting out the valve or rendering the same inoperative. In this embodiment 152 designates a valve casing having a bonnet 153 secured thereto, between which is located a diaphragm 154, preferably of the type already described in detail herein and having a rod 155 passing therethrough, which is provided with a counterbalance 156, as will be understood by reference to Figs. 4 and 12. 157 designates a conduit communicating with the chamber 158 above the diaphragm 154, and with a container 159, within which is an inverted tank 160, which forms an air cushion 161. 162 designates a conduit communicating with the valve outlet 163 and the conduit 157, and said conduit 162 is provided with controlling valves 164 and 191.

165 designates the valve stem having the valve heads 166 and 167 which control the passage of fluid from the inlet 168 through the baffle 169 to the outlet 163. 170 designates a cap secured to the valve stem 165 in a similar manner to that already described with reference to Fig. 6 and provided with pins 171 coöperating with the walls of the slots 172 in the levers 173, which are fulcrumed at 174 to the casing 152. The levers 173 are each provided with a cam groove 175, the center of the radius of which is the pivot 176 of an arm 177 having a slot 178 in which is adapted to extend a pin 179 of a nut 180. The arm 177 is pivoted at 181 to a shoe 182 adapted to travel in a cam groove or slot 175. The pivot 181 is carried by a bolt 183 extending through the diaphragm 154 and secured thereto by packing nuts 184. It will be seen that two levers 173 are provided and in order to simultaneously adjust both of such levers I provide a screw 185 having a grasping portion extending exteriorly of the casing and provided with a stuffing box 186, the end of said screw being mounted in a bracket 187 which permits the rotation of said screw and prevents longitudinal movement thereof. This screw is provided with threads of a different character thereon, such as for example, a right hand thread engaging one of the nuts 180 while the other of such nuts 180 is adapted to coact with the portion of said screw which has a left hand thread thereon. 188 designates an adjustable stop for positively closing the valve.

The operation of my novel valve or other regulating mechanism will now be readily apparent to those skilled in the art and is as follows:—Referring first to the embodiment seen in Fig. 1, my invention is illustrated as adapted for a governor for pumps or conduits or other similar purposes. The stop member 12 is adjusted to cause the valve heads 14 and 15 to be seated in closed position. The valves 51 and 53 are then opened and the fluid under pressure passes through the conduit 50 and the conduit 52 to the chambers on opposite sides of the diaphragm. The stop member 12 is actuated to move the same out of the path of the valve stem 16 prior to the opening of valves 51 and 53 and the actuating fluid passes through the valve 1 supplying steam to a pump of any type to compress the fluid which passes through the conduit 50. When a desired pressure is provided on each side of the diaphragm which will be the standard of working or operating pressure, the valve 53 is closed so that a fixed pressure is exerted against the air cushion 48. As the pressure varies in the conduit 50 the diaphragm will rise or fall thereby actuating the valve stem 16 and opening or closing the ports 5 and 6 to control the supply of motive fluid passing through the valve 1. It will be seen that the central spacing block 24 in which the rod 27 is fixed will have a range of movement depending upon the diameter of the bearing portion 38 of the limiting plug, and the diameter of the aperture 39 in the central spacing block 24. The walls of the aperture 39, in the spacing annulus 26, also serves as a fixed abutment to limit the range of movement of the bar 29, and it will also be apparent that the spacing rings 25 which form the extended flexible joint have their range of movement limited by the reduced bearings on the limiting plug, and the walls of the apertures in the respective spacing rings. The counterbalance 43 and its adjuncts serves to maintain the diaphragm and its adjuncts normally in a balanced condition, which is especially advantageous in cases wherein low pressures are to be controlled, such as for example the flow of gases, which are under comparatively low pressure. The throw of the valve stem 16 may be readily adjusted by actuating the nuts 32 and 33, in order to bring the valve heads 14 and 15 respectively, nearer to or farther from the yoke 30. It will be apparent that the standard of working pressure employed may be varied as desired, by admitting fluid under pressure through the conduit 52, into the chamber formed in the bonnet 20, and after the desired pressure is provided the valve 53 will be closed. In some cases arising in practice, it is advantageous to employ a controllable by-pass through the baffle, such, as for example 4, in Fig. 1. By adjusting the position of the valve 9 the volume of fluid passing through the by-pass formed by the port 7 may be regulated while the valve is in continuous operation, without the necessity of cutting out or shutting down the valve.

In the embodiment seen in Fig. 2, I have shown my invention as especially adapted to be employed as a reducing valve, and in many cases in practice the temperature of the fluid being controlled would vary and affect the air cushion in communication with the chamber attached to the diaphragm, and in such cases it is advantageous to locate the air cushion at a distance from such chamber but communicating therewith. The pressure exerted against the air cushion may be varied, as desired, by actuating the valve of the valve controlled conduit 63. Assuming that the pressure on the inlet side of the valve is one hundred pounds for example, and it is desired to reduce the same to a pressure of five pounds on the opposite side, the limiting plug or adjusting plug is operated to cause the valve heads to close, the steam or other fluid would then be turned on, and with the pressure on the inlet side the limiting and adjusting plug will be opened and the valve in the valve controlled conduit 63 will be opened, until a desired pressure, for example, five pounds is shown on the gage. The valve in the valve controlled conduit 53 is then closed fixing the standard of pressure against the diaphragm and against the air cushion at five pounds, the limiting plug is then fully opened allowing the variable pressure to control the diaphragm and thereby the valve.

In the embodiment seen in Fig. 5, I have shown my invention as especially adapted to be employed as a relief valve, and the operation of this embodiment is as follows: The valves in the valve controlled conduit 67 are opened and the pressure is then turned on the inlet side of the valve and raised to a desired degree above the standard of pressure to be used, such as for example for controlling the feed water line of a boiler. The valves are then closed and the pressure on the inlet side reduced to the standard desired, the valves being first closed. Any increase in pressure on the inlet side of the valve above the predetermined standard will cause the valve to open and the pressure will be relieved through the valve outlet.

Referring now to the embodiment seen in Figs. 6 to 8 inclusive, the manner of fixing the standard of pressure is the same as that already described with respect to Fig. 1, it being understood that any desired standard of pressure against the air cushion and the diaphragm may be provided by the proper actuation of the valves 53 and 51, it being understood that after the desired standard is provided the valve 51 is closed and the valve 53 opened so that the conduit 52 will be in communication with the variable pressure to be controlled. In this embodiment I also provide means whereby the throw of the valve relative to the travel of the diaphragm may be regulated as desired, so that the movement of the valve will be greater or less than the amount of movement imparted to the diaphragm. It will be apparent that by actuating the screw 85, the fulcrum points 79 of the levers 76 may be varied as desired it being seen that an adjustable or floating fulcrum is provided, which moves in the arc of a circle, the center of which is the point 81. By this means a simple and accurate manner of varying the throw of the valve while in operation is provided. It is preferable in practice to employ an adjustable yielding stop which in the present instance I have preferred to show as comprising two set screws 148 and 150, carried by the casing members 68 and 69, respectively, and adapted to coact with the counterbalance 43, and thus serve as a means to limit the movement of the diaphragm and thereby of the valve stem to any desired range of movement. It will of course be understood that the sectional plan view, seen in Fig. 4, applies equally as well to Fig. 6, as to Fig. 1. The limiting stop shown in this embodiment and located beneath the valve stem serves as a positive means to open the valve or to limit its closing movement, so that the equivalent of a by-pass is provided through the valve ports of the baffle.

Referring now to the operation of the embodiment seen in Fig. 9, the valve stem is first closed, ordinarily by causing the limiting stop to engage the valve stem and seat the valve heads. The pressure is then turned on the inlet side of the valve, and in the illustration shown this pressure is the element which is to be automatically controlled, such as for example a steam heating system for buildings. All the valves 108, 109, 111, 105, and the valve in the valve controlled conduit 112, are now opened, and the pressure entering through conduit 107 is exerted against each side of the diaphragm and against the air cushion 102 and the air cushion 117. When the desired standard of pressure under which it is desired to operate has been provided, the valves 111 and 108 are closed, thus leaving the chamber 104 in communication with the chamber of the container 100, which is a fixed pressure, while the chamber 110 is in communication with the chamber of the container 113 which forms the variable or controlling pressure. It will thus be apparent that any change in temperature at the place where the thermostatic element is located will change the pressure beneath the diaphragm 95 thereby causing the latter to operate and actuate the valve stem 99 to control any desired mechanism and in the present instance to control the flow of fluid through the valve. If the thermostatic element is located exterior of the building, the temperature within the building will be automatically controlled in accordance with the changes in temperature, taking place outside of the building, and it will also be apparent that it may be located in the room or any desired location in the building to automatically control a heating system and maintain a uniform temperature at any desired place. The throw of the valve may be adjusted in a similar manner to that already described with reference to Fig. 1, and it will be apparent that the valve or other mechanism may be connected with the diaphragm in a similar manner to that disclosed in the other embodiments of my invention, herein illustrated, and still be within the scope of my invention.

In all the embodiments of my invention which I have herein shown one can, if desired, employ a controllable by-pass through the baffle such as is specifically illustrated and described in connection with Fig. 3.

In the embodiment seen in Fig. 10, I provide an adjustable fixed operating pressure on one side of the diaphragm, by means of a liquid column communicating with the chamber 120. The valves 127 and 125 are closed, and the valves 128 and 130 and the valves in the valve controlled conduit 124 are open and the liquid is forced through the conduit 124 to vary the height of the liquid column until the indicator shows the desired working pressure. The valve in the valve controlled conduit 124 is then closed and the valve 130 is closed. The valves 127 and 128 are then opened, it being understood that the conduits 126 communicate with the variable source of fluid supply or pressure to be controlled. It will thus be seen that the valve stem 122 will be actuated in a manner similar to that already described with reference to other figures of the drawings, it being understood that the type of diaphragm employed would preferably correspond to the type which has herein been specifically described. In order to reduce the height of the liquid column the valve in the valve controlled conduit 125 is opened until the desired pressure is provided and then such valve is closed.

In the embodiment seen in Fig. 11, I have shown another manner of varying the standard of working pressure. The diaphragm is similar in construction to the type already described. The valve 144 is closed and the valves 145, 147 and the valve in the valve controlled conduit 135 are opened and the container 137 is raised or lowered until the indicator shows the predetermined standard of working pressure, the valve 147 is then closed, thereby fixing the working standard of pressure on one side of the diaphragm, and the valve 144 is opened thereby forming a communication between the chamber 133 and the variable source of fluid supply of pressure to be controlled, so that the valve stem 134 is actuated in accordance with the movement of the diaphragm 131. It will thus be clear that by manually actuating the member 142 the height of the container 137 and thereby the standard of working pressure employed may be quickly and accurately determined. The height of liquid in the container 137 may be maintained at any desired level by adjustment of the float controlled valve 139.

Referring now to the operation of the embodiment seen in Fig. 13, it will be evident that by actuating the valves 164 and 191, a desired pressure may be provided on the air or fluid cushion 161 and the diaphragm 154. In order to vary the throw of the valve relative to the movement of the diaphragm the screw 185 is adjusted thereby imparting a longer or shorter stroke relative to the diaphragm as is evident. I provide positive means for opening and closing the valve as best seen in Fig. 6. The valve in said figure may be opened and closed by adjusting the length of the valve stem, or by actuating the screw 85 or by adjusting the screws 148 and 150, seen in Fig. 12 in the proper directions to effect the opening or closing of the valve.

It will be apparent that while for purposes of illustration I have shown my novel regulating mechanism, as adapted to control valves of different types, that the same is not limited to such use, but that in its broad and generic scope it is adapted and designed to control automatically any desired mechanism.

Special attention is directed to the novel construction and arrangement of diaphragm, which may be employed with either high or low pressure without affecting the sensitiveness of its movement, and attention is also directed to the novel manner of connecting the diaphragm with mechanism exterior of the casing whereby the friction of the moving parts which is present in prior devices of this character, is practically all eliminated.

In so far as I am aware I am the first in the art to provide means for fixing any predetermined standard of working pressure, against one side of a controlling element, such as a diaphragm or its equivalent, which is capable of a universal range of adjustment without affecting the sensitiveness of the operation.

In so far as applicant is aware, he believes himself to be a pioneer in the subject-matter of the present application, and that he is the first in the art to devise a fluid cushion in which the pressure against the inner and outer confining wall of such cushion is equal at all degrees of pressure of the transmitting medium, and it is to be understood that his claims to such features are to be generically construed as of corresponding scope.

In cases wherein a spring element is employed, the action of the spring is only practicable within a certain defined and limited range of movement, and the life of a spring, as is well known, is limited to a certain number of vibrations, and after a certain length of time it becomes inoperative and ineffectual for the purpose for which it was intended. It also becomes inoperative when working under pressures beyond a certain range. The range of action of the air cushion is unlimited and universal, and may be instantly adjusted to any desired pressure without affecting in any way the sensitiveness or accuracy of the operation.

Special attention is also directed to the fact that in my present invention, I eliminate the necessity of employing springs, pistons, stuffing boxes or other friction elements and the consequent reduction in the sensitiveness of the apparatus arising from their use, and the only stuffing box required is in cases wherein the diaphragm mechanism is separated from the valve casing, and the employment of a stuffing box or the like would be a necessity in certain of the types of valves herein shown, but it is of course to be understood that my invention is not limited to the control of valves. The construction of the diaphragm and the manner of limiting its range of movement are such that it cannot be broken or injured by sudden and extreme changes in pressure, such as would occur for example if the variable fluid pressure was suddenly shut off or released while the pressure on the other side of the diaphragm was retained.

Special attention is also directed to the fact that in my present invention I provide novel means for balancing the diaphragm system and adjusting its effectiveness, while the diaphragm is in operation and also utilizing the balancing means to limit the stroke of such diaphragm in either direction to any desired range of movement. It will be further apparent that I provide a novel construction of a diaphragm and novel means for communicating the motion thereof exterior of the casing with practically no friction on the moving parts.

Special attention is also directed to the fact that by the employment of my present invention I am enabled to provide means controlled exterior of the casing for varying the travel of the valve relative to the travel of the diaphragm or its equivalent and such means may be located within the casing of the valve, or exterior thereof, and thus provide means for varying the throw of the valve without rendering it necessary to cut out the valve or interfere in any manner with its operation. It will be further apparent that in the types of valves herein shown, I have preferred to show a balanced valve, since such type of valve has proven in practice to give very advantageous results, in combination with a regulating mechanism as herein disclosed.

It is to be understood, that while I have preferred to illustrate a novel type of a diaphragm herein, my invention in its broad and generic scope is not limited to use with any specific type of diaphragm but is adapted to be used in conjunction with a movable element moved in opposite directions by different pressures, one of such pressures being substantially fixed and one or both of such pressures including a fluid cushion having a universal range of adjustment.

I am aware that it has heretofore been proposed to employ an air cushion above a column of water in a single chamber, such water acting against a diaphragm but this is not practicable since it is impossible to maintain the air cushion constant, owing to leakage and absorption of air by the water. In my present invention, these defects of prior devices have been absolutely overcome, owing to the fact that I employ a closed container filled with fluid, within which is located a fluid cushion surrounded and preferably sealed by the fluid in the closed container. By such construction, I am enabled to maintain a constant volume of fluid cushion under all conditions and all standards of operating pressure. I am also aware that it has been heretofore proposed to employ an inverted container sealed at its open end by the fluid in an outer container and subjected on its top to atmospheric pressure, said inverted container being connected with a valve mechanism. This prior construction has a very limited range of operation, since a comparatively slight increase in pressure will break the seal and destroy the cushion. Furthermore, the friction of the operating parts destroys the sensitiveness of the device and the effect of the cushion is not transmitted by the liquid but by the inverted container. These defects are entirely eliminated in my present invention.

It will now be apparent that I have devised a novel and useful construction of a fluid cushion valve or other regulating mechanism which embodies the features of advantage enumerated as desirable in the statement of the invention and the above description, and while I have, in the present instance shown and described preferred embodiments thereof which have been found in practice to give satisfactory and reliable results, it is to be understood that the same are susceptible of modification in various particulars without departing from the spirit or scope of the invention or sacrificing any of its advantages.

Having thus described my invention what I claim as new and desire to secure by Letters Patent, is:—

1. In a regulating mechanism, a movable element subjected on one side to a variable pressure, and on the opposite side to a substantially constant pressure having a universal range of adjustment and including a fluid cushion suspended in and surrounded by a transmitting medium, and mechanism actuated by said movable element.

2. In a regulating mechanism, a movable element subjected on one side to a variable pressure and on the opposite side to a substantially constant pressure having a universal range of adjustment and including an adjustable fluid cushion surrounded by a liquid transmitting medium, and mechanism actuated by said movable element.

3. In a regulating mechanism, a movable element subjected on one side to a variable pressure and on the opposite side to a substantially constant pressure which includes a fluid cushion and a liquid transmitting medium surrounding such cushion, means to adjust said constant pressure to any predetermined standard of pressure, and mechanism actuated by said movable element.

4. In a regulating mechanism, a movable element subjected on one side to a variable pressure, and on the opposite side to a substantially constant pressure having a universal range of adjustment and including a fluid cushion and a transmitting medium surrounding said cushion, mechanism actuated by said movable element, and devices for varying the travel of said mechanism relative to the travel of said movable element.

5. In a regulating mechanism, a movable element subjected on one side to a variable pressure, and on the opposite side to a substantially constant pressure and including a fluid cushion surrounded by a transmitting medium, means to adjust said constant pressure to any predetermined standard, a counterbalance for said movable element, and mechanism controlled by said movable element.

6. In a regulating mechanism, a movable element subjected on one side to a variable pressure, and on the opposite side to a substantially constant pressure, having a universal range of adjustment and including a fluid cushion surrounded by a transmitting medium, means to limit the range of movement of said movable element, and mechanism controlled by said movable element.

7. In a regulating mechanism, a movable element subjected on one side to a variable pressure and on the opposite side to a substantially constant pressure formed by an inverted fluid container sealed and surrounded by a transmitting medium, means for producing said variable pressure, and mechanism controlled by said movable element.

8. In a regulating mechanism, a movable element subjected on one side to the pressure exerted by a plurality of non-mixing fluids forming an elastic cushion, one of said fluids completely surrounding and forming a fluid seal for the other cushion, and subjected on the opposite side to a variable fluid pressure, and mechanism controlled by said movable element.

9. In a regulating mechanism, a movable element subjected on one side to a variable pressure and on the opposite side to a substantially constant pressure formed by a cushion surrounded by a transmitting medium, means to adjust said constant pressure to any desired standard, in combination with a valve mechanism having a balanced valve controlled by said movable element.

10. In a regulating mechanism, a movable element subjected on one side to a variable pressure, and on the opposite side to a substantially constant pressure having a universal range of adjustment and including a fluid cushion surrounded by a liquid transmitting medium, a connection secured to said movable element and having a defined range of movement therewith, and mechanism controlled by said connection.

11. In a regulating mechanism, a casing, a movable element within the casing and forming pressure chambers on opposite sides of said element, a valve controlled conduit communicating with one of said chambers, a valve controlled conduit communicating with the other of said chambers and with said conduit, a container in one of said chambers surrounded by liquid and forming an elastic cushion, and mechanism controlled by said movable element.

12. In a regulating mechanism, a movable element subjected on one side to a variable pressure, and on the opposite side to a substantially constant pressure formed by a fluid cushion surrounded by a liquid transmitting medium, means to maintain any predetermined standard of constant pressure, an adjustable counterbalance for said movable element, means to limit the range of movement of said counterbalance, and mechanism controlled by said movable element.

13. In a regulating mechanism, a movable element subjected on one side to a variable fluid pressure, and on the opposite side to a substantially constant pressure, which latter includes an elastic cushion surrounded by a liquid, means to vary the volume of said cushion, and mechanism controlled by said movable element.

14. In a regulating mechanism, a movable element comprising a plurality of flexible diaphragms, spacing means between said diaphragms and comprising a central member and eccentric rings, said movable element being subjected on opposite sides to different pressures, and mechanism connected with said movable element and controlled thereby.

15. In a regulating mechanism, a movable element comprising a plurality of flexible diaphragms, having spacing means therebetween, and limiting means to permit the central portion of said diaphragms to have a greater range of movement than the portions exterior of said central portion, said movable element being subjected on opposite sides to different pressures, and mechanism connected with and controlled by said movable element.

16. In a regulating mechanism, a movable element comprising a plurality of flexible members fixedly supported at the outer portions, and having spacing means therebetween to cause said diaphragms to move in unison with each other, a rod passing through said spacing means, said movable element being subjected on opposite sides to different pressures, an adjustable counterbalance carried by said rod, and mechanism connected with and controlled by said rod.

17. In a regulating mechanism, a movable element subjected on one side to a variable pressure and on the opposite side to a substantially constant pressure having a universal range of adjustment and including a fluid cushion surrounded by a transmitting medium, in combination with a valve body having a manually controllable by-pass between the inlet and outlet of the valve body, and a second valve controlling said valve body inlet and outlet and automatically controlled by said movable element.

18. In a regulating mechanism, a movable element subjected on one side to a variable pressure, and on the opposite side to a substantially constant pressure formed by a plurality of non-mixing fluids, one of said fluids being surrounded by the other fluid to form therewith a fluid cushion, means for varying the pressure of said fluids, and mechanism controlled by said movable element.

19. In a regulating mechanism, a movable element subjected on one side to the pressure exerted by an adjustable elastic fluid cushion completely surrounded by liquid, and on the opposite side to a variable pressure, and mechanism controlled by said movable element.

20. In a regulating mechanism, a casing, a movable element dividing the casing into chambers, an elastic fluid cushion separate from said casing but within one of said chambers to provide a substantially constant elastic fluid cushion surrounded by liquid, the opposite side of said element being subjected to the variable pressure, means to vary the standard of pressure of said elastic fluid cushion, and mechanism controlled by said movable element.

21. In a regulating mechanism, a casing, a diaphragm therein dividing said casing into two chambers, an inverted tank in one of said chambers, controllable means for admitting fluid into the tank containing chamber to fill said chamber and seal the end of said tank to form a fluid cushion therein, the other of said chambers being in communication with a source of variable fluid pressure, devices connected with said diaphragm, and mechanism controlled by said device.

22. In a reglating and controlling device, a casing, a diaphragm therein subjected on opposite sides to fluid pressures, said diaphragm comprising a plurality of flexible members, means for preventing relative movement of the central portion of said members, devices between and in contact with said members for forming an extended flexible joint between the central and outer portions, and power transmitting means operatively connected with said diaphragm.

23. In a regulating and controlling device, a casing, a diaphragm comprising a plurality of flexible members spaced apart and supported by said casing at their periphery, said diaphragm being subjected to fluid pressure on opposite sides thereof, means between the members and in contact therewith for preventing relative movement of the central portions of said members, devices between the members and in contact therewith, for forming an extended flexible joint between the central portions and their periphery, and power transmitting means operatively connected with said first named means.

24. In a regulating and controlling device, a casing, a diaphragm therein comprising the following instrumentalities; a plurality of flexible members connected with said casing at their outer periphery, means between said members and in contact therewith for preventing relative movement of the central portions thereof, devices for forming an extended flexible joint between the central portions and their periphery, means for progressively limiting the movement of said devices, and power transmitting means extending laterally through said devices.

25. In a regulating and controlling mechanism, a casing and a diaphragm therein comprising the following instrumentalities; a plurality of flexible members connected with the said casing at their periphery, means between said members for preventing relative movement of the central portions of said members, concentric rings between and contacting with said members for forming an extended flexible joint between the central portions and their periphery, and power transmitting means passing through said concentric rings.

26. In a regulating and controlling mechanism, a casing, and a diaphragm therein, comprising the following instrumentalities; a plurality of flexible members supported within said casing, means for preventing relative movement of the central portions of said members, concentric rings forming an extended flexible joint between the central and outer portions of said members, means for limiting the movement of said rings to vary the amount of movement permitted to each ring, and power transmitting means passing through said rings.

27. In a regulating and controlling mechanism, a casing, and a diaphragm therein, comprising the following instrumentalities; a plurality of flexible members connected with said casing, means for filling the central portion between said members, a spacing annulus between said members near their outer edges, independently movable spacing members between the spacing annulus, the filling means, and said flexible members, and power transmitting means operatively connected with the central portion of said diaphragm.

28. In a regulating and controlling mechanism, a casing, and a diaphragm therein subjected on opposite sides to fluid pressure and comprising the following instrumentalities; a plurality of flexible members connected with said casing, means for filling the central portion between the members, a spacing annulus between the members near their outer edges, independently movable spacing members between and in contact with said members and between the spacing annulus and the filling means, means for limiting the amount of movement permitted to said independently movable spacing members, and power transmitting means operatively connected with said diaphragm.

29. In a regulating and controlling mechanism, a casing, a diaphragm therein subjected on opposite sides to fluid pressure and comprising the following instrumentalities; a plurality of flexible members secured at their periphery to said casing, means for preventing relative movement of the central portions of said members, a spacing annulus between said members near their outer edges, devices between said members in proximity to said annulus and forming an extended flexible joint, in combination with a valve mechanism operatively connected with and controlled by the movement of said diaphragm.

30. In a regulating and controlling mechanism, a casing, a diaphragm secured therein at its outer periphery and comprising a plurality of flexible members, a spacing annulus between said members at their outer periphery, devices in proximity to said annulus for forming an extended flexible joint, means for maintaining a constant pressure on one side of said diaphragm, means for exerting a variable pressure against the opposite side of said diaphragm, in combination with power transmitting means operatively connected with said diaphragm between the flexible members thereof and extending exterior of said casing.

31. In a regulating and controlling mechanism, a casing, a diaphragm secured therein at its outer periphery and forming two separate chambers adapted to receive fluid pressure, said diaphragm comprising a plurality of flexible members, a spacing annulus between the members at the outer periphery, and devices in proximity to said annulus for forming an extended flexible joint, a fluid conduit communicating with one of said chambers, a container communicating with the other of said chambers, a cushion within said chamber, and mechanism controlled by said diaphragm.

32. In a regulating and controlling mechanism, a casing having a diaphragm therein subjected on one side to fluid under a substantially constant pressure and on the opposite side to a variable fluid pressure, and a compressible cushion surrounded by and subjected to the substantially fixed pressure.

33. In a regulating and controlling mechanism, a casing having a diaphragm therein subjected on one side to fluid under a substantially constant pressure and on the opposite side to a variable fluid pressure, a compressible cushion surrounded by and subjected to the substantially fixed pressure, and means for varying the standard of fixed pressure employed.

34. In a regulating and controlling mechanism, a casing having a diaphragm therein subjected on one side to fluid under a substantially constant pressure and on the opposite side to a variable fluid pressure, a compressible cushion surrounded by and subjected to the substantially fixed pressure, and means for varying the volume of fluid in said cushion.

35. In a regulating and controlling mechanism, a casing, a diaphragm therein dividing the same into two chambers, one of said chambers communicating with a variable source of fluid supply, the other of said chambers having a fluid therein under a substantially constant pressure, and an inverted container disconnected from other mechanism and having its lower end sealed by the fluid under substantially constant pressure to form an air cushion within such inverted container.

36. In a regulating mechanism, a movable element, subjected on one side to a pressure exerted by a plurality of non-mixing fluids, one of said fluids completely surrounding the other fluid, thereby forming an elastic cushion normally under a predetermined pressure, and subjected on the opposite side to a variable pressure, and mechanism controlled by said variable element.

37. In a regulating mechanism, a movable element, subjected on one side to a variable pressure, and on the opposite side to a substantially constant pressure having a universal range of adjustment and including a fluid cushion suspended in a liquid and disconnected from other mechanism, a connection secured to said movable element and having a defined range of movement therewith, means to vary said defined range of movement, and mechanism controlled by said connection.

38. In a regulating mechanism, a casing, a movable element therein comprising a plurality of flexible members fixedly supported at the outer portions, and having spacing means therebetween to cause said members to move in unison with each other, said movable element being subjected on opposite sides to different pressures, means connected with said spacing means to communicate the movement of the diaphragm exterior of the casing, an adjustable counterbalance for said means, and mechanism controlled by said means.

39. In a regulating mechanism, a movable element subjected on one side to a liquid providing a substantially constant pressure and on the opposite side to a variable pressure, a compressible cushion subjected to the substantially constant pressure surrounded thereby, and disconnected from other mechanism, and means to vary the volume of fluid in said cushion.

40. In a regulating mechanism, a movable element subjected on one side to a substantially constant pressure and including an air cushion having a universal range of adjustment, and subjected on the opposite side to a variable pressure, means to progressively limit the movement of said element whereby the central portion thereof has a greater range of movement than the portions outwardly thereof, a valve controlled by said element, and means to positively open and close said valve.

41. In a regulating mechanism, a movable element, subjected on one side to a substantially constant pressure having a universal range of adjustment, and which includes an air cushion surrounded by a transmitting medium, and subjected on the opposite side to a variable pressure, a valve controlled by said element, and manually actuated means to positively seat and unseat said valve and to limit the range of its movement in either direction.

42. In a regulating mechanism, a casing, a diaphragm therein forming chambers on opposite sides thereof, a counterbalance for said diaphragm, means to limit the travel of said counterbalance, means to introduce fluid under pressure into one of said chambers, an inverted container surrounded by said fluid and having its lower end sealed thereby, a source of variable fluid supply communicating with the other of said chambers, and mechanism controlled by said diaphragm.

43. In a regulating mechanism, a casing, a movable element therein dividing said casing into two separate chambers, a counterbalance for said element, means to vary the effective weight of said counterbalance, means to limit the movement of said counterbalance and thereby of said element, an inverted container in one of said chambers, means to introduce liquid into said container chamber to seal the lower end of said container and to surround the same, a variable source of pressure supply in communication a cushion within said container, and mechanism operatively connected with said movable element.

44. In a regulating mechanism, a casing, a movable element therein dividing said casing into two chambers, an inverted container in one of said chambers, means to introduce liquid under a predetermined pressure to fill the chamber in which the container is located and seal the lower end of the latter to thereby form a fluid cushion therein, a source of variable fluid supply communicating with the other of said chambers, a member passing transversely through said element and exterior of said casing, a counterbalance carried by said member, and mechanism operatively connected with said member.

45. In a regulating mechanism, a casing, a movable element therein dividing said casing into two chambers, means to introduce liquid under pressure into one of said chambers, a fluid cushion within said chamber and surrounded by the liquid therein, a member passing transversely through said movable element, a second member operatively connected with said first member, means to vary the stroke of said second member with respect to the stroke of said movable element, and a source of variable fluid supply communicating with the other of said chambers.

46. In a regulating mechanism, a casing, a movable element therein dividing said casing into two chambers and subjected on opposite sides to different pressures, a member passing transversely through said movable element, a counterbalance connected with said member, means to vary the effective weight of said counterbalance, adjusting devices engaging said counterbalance to limit the travel of said movable element in either direction, links connected with said member, a second member operatively connected with said links, and means to vary the stroke of said second member with respect to the stroke of said movable element.

47. In a regulating mechanism, a casing, a movable element therein dividing said casing into two chambers, means to maintain liquid in one of said chambers under a predetermined pressure, an invented container suspended in and sealed by the liquid in such chamber, a variable source of fluid supply in valve controlled connection with both of said chambers, and mechanism operatively connected with said movable element.

48. In a regulating mechanism, a casing, a movable element therein dividing said casing into two chambers, a variable source of fluid supply in valve controlled communication with both of said chambers whereby a predetermined constant pressure may be maintained in one chamber, and a variable pressure in the other chamber, a fluid cushion surrounded by the liquid under constant pressure, and a freely rotatable member operatively connected with said movable element.

49. In a regulating mechanism, a casing, a movable element therein dividing said casing into two chambers, a variable source of fluid supply, valve controlled conduits communicating therewith and with said chambers whereby one side of said element is subjected to a variable pressure and the other side thereof to a substantially constant pressure, a fluid cushion in the chamber having fluid under a substantially constant pressure and suspended in and surrounded by the fluid therein, a member operatively connected with said movable element, and means to vary the stroke of said member with respect to the stroke of said movable element.

50. In a regulating mechanism, a casing, a movable element therein dividing said casing into two chambers, a source of variable fluid supply in valve controlled communication with both of said chambers whereby one side of said element is subjected to a substantially constant pressure and the other side thereof to a variable pressure, a fluid cushion suspended in and surrounded by the fluid under substantially constant pressure, a member connected with said movable element, power transmitting devices connected with said member and including links having a second set of links movably connected therewith, and means to vary the position of said second set of links whereby the stroke of said power transmitting devices will vary relatively to the stroke of said movable element.

51. In a device of the character stated, a fluid cushion, a transmitting medium surrounding said fluid cushion and exerting a pressure against said fluid cushion, whereby the pressure of the fluid cushion is equal to that of the transmitting medium at any standard of pressure of such transmitting medium, and mechanism controlled by said transmitting medium.

52. In a device of the character stated, a container having a fluid cushion therewithin, a transmitting medium exerting a pressure against said cushion and against the exterior of said container whereby the pressures interior and exterior of said container are equal at any standard of pressure of the transmitting medium, and mechanism controlled by said transmitting medium.

53. In a device of the character stated, a container having a fluid cushion therewithin, a transmitting medium exerting a pressure against said cushion and against the exterior of said container whereby the pressures interior and exterior of said container are equal at any standard of pressure of the transmitting medium, mechanism controlled by said transmitting medium, and means to vary the standard of pressure of said transmitting medium.

54. In a fluid cushion, the combination wth a closed chamber, of means for confining a transmitting fluid therein under a predetermined pressure, and means for containing a fluid cushion within said chamber in position to be surrounded by said transmitting fluid.

55. The combination with a movable element, of means for subjecting it on one side to a substantially constant pressure having a universal range of adjustment which includes a fluid cushion surrounded by a transmitting medium.

56. In a regulating mechanism, the combination with a movable element subjected on one side to a variable pressure, of means for subjecting it on the opposite side to a substantially constant pressure having a universal range of adjustment which includes a fluid cushion surrounded by a transmitting medium, a valve casing, a valve therein controlled by said movable element, and means to vary the travel of said valve relative to the travel of said movable element.

57. In a regulating mechanism, the combination with a fluid cushion container, of a passage for the transmitting medium surrounding said container whereby fluid pressures within and without the container are equal.

FRANCIS H. BROWN.

Witnesses:
H. S. FAIRBANKS,
C. D. McVAY.